Oct. 26, 1937.  A. M. STRUNK  2,096,864

HITCH

Filed Dec. 2, 1936.

INVENTOR.
ANTHONY M. STRUNK

BY Charles R Werner

ATTORNEY.

Patented Oct. 26, 1937

2,096,864

UNITED STATES PATENT OFFICE 2,096,864

HITCH

Anthony M. Strunk, Colwich, Kans.

Application December 2, 1936, Serial No. 113,754

9 Claims. (Cl. 55—84)

This invention relates in general to a tractor hitch and particularly to a hitch for connecting one or more gangs of spiked tooth harrows to a tractor.

The objects of the invention are, first; to provide a sectional hitch comprising sleeved members of various lengths, whereby certain combinations of members or drawbars will provide a hitch for one, two, three or more gangs of harrows as desired.

Second; to provide a hitch having sufficient vertical flexibility whereby the harrows may be dragged over uneven ground without detracting from or interfering with the soil working characteristics thereof.

Third; to provide a hitch of the class described which may be conveniently disassembled and stored in a minimum of space.

Fourth; to provide a tractor hitch in which no bolts are necessary for assembling thereby eliminating delays and inconvenience caused by rusted or damaged bolts.

Fifth; to provide in a tractor hitch, a cross clevis to which the links or pulls may be quickly and easily affixed and which may be conveniently attached to the tractor.

The advantages of my invention are manifold. As far as I am aware there is no hitch in which assembly bolts are eliminated and which can be changed and parts combined to make a hitch for any number of harrows. Since there are no bolts, it is unnecessary to keep on hand any special tools or wrenches for assembly purposes. Another advantage is the ease with which the device may be disassembled and the harrows placed one on top of the other when it is necessary to pass through a gate or narrow opening in a fence.

Further objects and advantages of my invention will be apparent by reference to the following description in connection with the accompanying drawing in which:

Fig. 1 is a top plan view of my device assembled as a hitch for a three gang harrow.

Fig. 2 is a detailed view of a hook with retaining ring for use with links or pulls in my hitch.

Fig. 3 is a detail view of the detachable clevis used in my device.

Fig. 4 is a top plan view of the hitch used as a four gang harrow hitch.

Fig. 5 is a similar view of the device for use with five harrows.

Fig. 6 is a diagrammatic top plan view of the device assembled for use with a six gang harrow.

Fig. 7 is also a diagrammatic top plan view showing a hitch for a seven gang harrow.

Referring now to the drawing, the hitch in Fig. 1 comprises a center member or drawbar 1 having end members or drawbars 2 in sleeved relation therewith. Eyes 3 are provided on members 1 and 2 whereby the hitch may be connected to the harrows. The center member 1 is provided with eyes 4 to which links or pulls 5 may be attached. The ends of links 5 terminate at a ring 6 to which center chain link 7 is secured. At the outer ends of the end members or drawbars 2 are positioned removable clevises 8 to which side links or pulls 9 may be secured. The eyes 3 at the outer end of members 2 act as stops for clevis 8 and pins 4' on member 1 and pins 18' on members 16 provide stops against which the ends of the sleeved members abut.

Links or pulls 9 include rings 10 and chain links 11. A cross clevis 12 is provided for attaching the hitch to the tractor, said cross clevis having a tractor connecting extension 13, side link receiving extensions 14 and center link receiving extension 15. In the combination shown in Fig. 1 a hitch has been provided for a three gang harrow.

In Fig. 4 is shown a four gang hitch, the center member or drawbar 16 being in sleeved relation to the elongated end members or drawbars 17. Eyes 3 for attachment of the hitch to the harrows are also provided. The center member 16 has a transverse link 18 adjustably connected thereto by means of nut 19. Center chain link 7 is attached to transverse link 18 and to cross clevis 12 in the same manner as shown in Fig. 1. Adjustable stops 20 are slidably positioned on elongated end members 17, the clevises 8 abutting thereagainst. Side links or pulls 9, rings 10 and chain links 11 are provided in the same manner as shown in Fig. 1. The position of stops 20 has been predetermined and therefore need not be reset after the correct adjustment has been found.

In Fig. 5 a hitch is shown for a five gang harrow, the center member 1 being combined with the elongated end members 17, the only other change necessary being to unhook the side chain links 11 from the ring 10 and hooking the end of said link 11 to the side link receiving extensions 14 of cross clevis 12, to elongate the side links as shown.

In the diagrammatic view in Fig. 6 a six gang hitch has been provided by utilizing one member 16 and two members 16' having a short eye and to which are engaged two members or drawbars 2 and two members 17, extra side links or pulls 21 being provided to span the longer distance from the cross clevis 12 to the stops 20 on the elongated end members or drawbars 17. Also center extension link or pull 24 and ring 25 are provided to bridge the space between the cross clevis 12 and the end of link 7.

Fig. 7 shows a seven gang hitch using a center member 1, two intermediate members 2, two short members 16' and two end members 17, the links being made up of a combination of parts used in the previously described hitches.

In Fig. 2 a detail of hooks 22 is shown, a ring 23 being used to prevent said hook from leaving the clevis 8, ring 10 or other member with which the hook is associated.

Fig. 3 shows a detail view of the clevis 8 in position on hitch member 17 which uses stops 20 as perviously described. The clevis is ordinarily prevented from leaving the member 17 by the eye 3. However, when said clevis 8 is turned 180° it may easily pass over the eye 3 as indicated by dotted lines.

In all cases where the drawbars sleeve one on the other there is sufficient clearance between the members to allow the entire hitch to flex when the harrows are being dragged over uneven ground.

From the foregoing it will be seen that I have provided a hitch, the parts of which can be changed and combined to be used with one, two, three or more gangs of harrows. By the complete absence of assembly bolts, the disadvantage is eliminated by using wrenches or other tools and coping with rusted and damaged bolts. Very little time is required to assemble or disassemble the hitch and the parts thereof may be stored in a very small space. The flexible characteristics of my hitch permit an even harrowing of the soil regardless of the topography thereof.

The construction used in present hitches ordinarily places the harrow at a comparatively great distance from the tractor or pulling device and the weight of the hitch will cause it to drag and interfere with its operation. In my hitch, however, this defect is overcome due to the close coupling of the harrow and tractor and the relatively light construction used. By using tubular drawbars great strength combined with extreme lightness is achieved.

While primarily designed to be used with spiked tooth harrows it is apparent that the use of my hitch need not be limited to this particular implement since there are other farm implements which are employed in one or more gangs, in which a hitch of this nature may be advantageous. Slight changes in form, proportion and details of construction may be resorted to without departing from the spirit of my invention.

What I claim as new and desire to secure by Letters-Patent is:

1. A convertible hitch comprising a plurality of drawbars of various lengths, certain of the drawbars being adapted to sleeve on certain of the other drawbars to form a substantially rectilinear drawbar, a cross clevis spaced from the assembled drawbar and adapted for attaching the hitch to a tractor or the like, and links or pulls detachably connected to the drawbars and converging at the cross clevis.

2. A convertible hitch comprising a plurality of drawbars of various lengths, certain of the drawbars being adapted to sleeve on certain of the other drawbars to form a substantially rectilinear drawbar, a cross clevis spaced from the assembled drawbar and adapted for attaching the hitch to a tractor or the like, clevises removably positioned on the end drawbars, and links or pulls detachably connected to the clevises and converging at the cross clevis.

3. A convertible hitch comprising a plurality of drawbars of various lengths, certain of the drawbars being adapted to sleeve on certain of the other drawbars to form a substantially rectilinear drawbar, a cross clevis spaced from the assembled drawbar and adapted for attaching the hitch to a tractor or the like, adjustable stops mounted on the end drawbars, clevises removably positioned against the stops, and links or pulls detachably connected to the clevises and converging at the cross clevis.

4. A convertible hitch comprising a plurality of drawbars of various lengths, certain of the drawbars being adapted to sleeve on certain of the other drawbars to form a substantially rectilinear drawbar, a cross clevis spaced from the assembled drawbar and adapted for attaching the hitch to a tractor or the like, and adjustable links or pulls detachably connected to the drawbars and converging at the cross clevis.

5. A hitch comprising a center sleeve member or drawbar, end members or drawbars loosely sleeved in said center member to form a substantially rectilinear drawbar, a cross clevis spaced from the assembled drawbar and adapted for attaching the hitch to a tractor or the like, and links or pulls detachably secured to said drawbars and converging at said cross clevis.

6. A hitch comprising a center sleeve member or drawbar, end members or drawbars loosely sleeved in said center member, a cross clevis for attaching the hitch to a tractor or the like, and links or pulls detachably secured to said drawbars and to said cross clevis, stops on said center sleeve member or drawbar against which the ends of said end members or drawbars abut.

7. A hitch comprising a plurality of male and female sleeve members or drawbars to form a substantially rectilinear drawbar, a cross clevis spaced from the assembled drawbars and adapted for attaching the hitch to a tractor or the like, links or pulls attached to said members or drawbars and converging at said cross clevis, means for combining certain of the male members with certain of the female members, and means for changing the length of the links or pulls whereby the hitch may be adapted for use with one, two, three or more gang harrow or the like.

8. A convertible hitch comprising a plurality of drawbars of various lengths, certain of the drawbars being adapted to sleeve on certain of the other drawbars to form a substantially rectilinear drawbar, a cross clevis spaced from the assembled drawbar and adapted for attaching the hitch to a tractor or the like, links or pulls detachably connected to the drawbars and converging at the cross clevis, said drawbars being in relatively loose sleeved relation with each other whereby said hitch will have a certain degree of vertical flexibility.

9. In a hitch comprising drawbars having eyes for attachment of one or more harrows, a cross clevis for attachment of the hitch to a tractor or the like, clevises removably positioned on the drawbars, links or pulls attached to the cross clevis and to the clevises on the drawbars, said last named clevises being adapted to slip onto the drawbars over the eye, said eye after 180° rotation of the clevis, preventing accidental removal of said clevis.

ANTHONY M. STRUNK.